US012102119B2

(12) United States Patent
Yang et al.

(10) Patent No.: US 12,102,119 B2
(45) Date of Patent: Oct. 1, 2024

(54) AEROSOL GENERATING ARTICLE AND AEROSOL GENERATING SYSTEM

(71) Applicant: KT&G CORPORATION, Daejeon (KR)

(72) Inventors: Jin Chul Yang, Sejong (KR); Soo Ho Kim, Cheongju-si (KR); Jong Yeol Kim, Sejong (KR); Man Seok Seo, Seoul (KR); Ki Jin Ahn, Daejeon (KR); In Hyeog Oh, Sejong (KR)

(73) Assignee: KT&G CORPORATION, Daejeon (KR)

( * ) Notice: Subject to any disclaimer, the term of this patent is extended or adjusted under 35 U.S.C. 154(b) by 1098 days.

(21) Appl. No.: 16/966,573

(22) PCT Filed: Nov. 15, 2019

(86) PCT No.: PCT/KR2019/015612
§ 371 (c)(1),
(2) Date: Jul. 31, 2020

(87) PCT Pub. No.: WO2020/105966
PCT Pub. Date: May 28, 2020

(65) Prior Publication Data
US 2020/0359678 A1 Nov. 19, 2020

(30) Foreign Application Priority Data
Nov. 23, 2018 (KR) ........................ 10-2018-0146530

(51) Int. Cl.
*A24D 1/20* (2020.01)
*A24D 3/17* (2020.01)
(Continued)

(52) U.S. Cl.
CPC ................. *A24D 1/20* (2020.01); *A24D 3/17* (2020.01); *A24F 40/20* (2020.01); *H05B 3/0014* (2013.01); *H05B 6/108* (2013.01)

(58) Field of Classification Search
CPC . A24D 1/20; A24D 3/17; A24D 1/045; A24D 1/08; A24D 3/0287; A24F 40/20;
(Continued)

(56) References Cited

U.S. PATENT DOCUMENTS 10,588,347 B2 * 3/2020 Malgat .................. A24F 40/465
11,000,061 B2 5/2021 Lavanant et al.
(Continued)

FOREIGN PATENT DOCUMENTS

BR 112014031909 B1 * 12/2020 ............... A24D 1/20
CN 105764367 A 7/2016
(Continued)

OTHER PUBLICATIONS

Supplementary European Search Report issued Dec. 15, 2021 in European Application No. 19887718.5.
(Continued)

*Primary Examiner* — Abdullah A Riyami
*Assistant Examiner* — Nader J Alhawamdeh
(74) *Attorney, Agent, or Firm* — Sughrue Mion, PLLC

(57) ABSTRACT

An aerosol-generating article according to an embodiment may include a medium portion, a front end plug disposed to face an upstream end of the medium portion, and a filter portion disposed to face a downstream end of the medium portion, wherein the front end plug includes a channel extending from the upstream end to the downstream end.

7 Claims, 5 Drawing Sheets

(51) Int. Cl.
*A24F 40/20* (2020.01)
*H05B 3/00* (2006.01)
*H05B 6/10* (2006.01)

(58) Field of Classification Search
CPC .......... A24F 40/10; A24F 40/30; A24F 40/46; H05B 3/0014; H05B 6/108; H05B 3/04; H05B 2203/013; H05B 2203/021; H05B 2203/022; H05B 3/44; A24C 5/1885; A24C 5/475
See application file for complete search history.

(56) References Cited

U.S. PATENT DOCUMENTS

| | | | | |
|---|---|---|---|---|
| 11,083,213 | B2 | 8/2021 | Malgat et al. | |
| 2012/0291792 | A1 | 11/2012 | Treadaway et al. | |
| 2015/0181929 | A1 | 7/2015 | Lisan et al. | |
| 2016/0309782 | A1* | 10/2016 | Malgat | A24F 40/465 |
| 2018/0177235 | A1 | 6/2018 | Minzoni | |
| 2019/0014815 | A1 | 1/2019 | Lavanant et al. | |
| 2019/0021392 | A1 | 1/2019 | Minzoni | |
| 2019/0075845 | A1 | 3/2019 | Malgat et al. | |
| 2020/0154776 | A1 | 5/2020 | Lee et al. | |
| 2020/0359678 | A1* | 11/2020 | Yang | H05B 3/0014 |
| 2023/0145813 | A1* | 5/2023 | Jang | A24D 1/02 131/280 |
| 2023/0165313 | A1* | 6/2023 | Lee | A24F 40/53 131/329 |
| 2023/0210163 | A1* | 7/2023 | Hwang | A24D 3/10 131/352 |
| 2023/0217987 | A1* | 7/2023 | Ahn | A24D 1/02 131/329 |

FOREIGN PATENT DOCUMENTS

| | | | | |
|---|---|---|---|---|
| CN | 107846970 A | 3/2018 | | |
| CN | 108366619 A | 8/2018 | | |
| CN | 108601407 A | 9/2018 | | |
| EP | 0430658 A2 | * | 6/1991 | A24B 15/16 |
| EP | 0 430 658 B1 | 11/1994 | | |
| EP | 2241203 A2 | 10/2010 | | |
| EP | 3273808 A1 | 1/2018 | | |
| EP | 3818872 A1 | 5/2021 | | |
| EP | 3818883 A1 | 5/2021 | | |
| JP | 2955557 B1 | 10/1999 | | |
| KR | 10-2003-0093631 A | 12/2003 | | |
| KR | 20140119063 A | * | 10/2014 | A24F 47/00 |
| KR | 10-2015-0038392 A | 4/2015 | | |
| KR | 10-2017-0142218 A | 12/2017 | | |
| KR | 10-2018-0020136 A | 2/2018 | | |
| KR | 10-2018-0050342 A | 5/2018 | | |
| KR | 10-2018-0111460 A | 10/2018 | | |
| KR | 10-2018-0118767 A | 10/2018 | | |
| WO | 2016/156223 A1 | 10/2016 | | |
| WO | 2017/182485 A1 | 10/2017 | | |

OTHER PUBLICATIONS

International Search Report for PCT/KR2019/015612 dated Feb. 25, 2020 [PCT/ISA/210].

Office Action dated Nov. 18, 2022 from the Chinese Patent Office in Application No. 201980010588.X.

* cited by examiner

AEROSOL GENERATING ARTICLE AND AEROSOL GENERATING SYSTEM

CROSS REFERENCE TO RELATED APPLICATIONS

This application is a National Stage of International Application No. PCT/KR2019/015612 filed Nov. 15, 2019, claiming priority based on Korean Patent Application No. 10-2018-0146530 filed Nov. 23, 2018.

TECHNICAL FIELD

The present disclosure relates to an aerosol-generating article and an aerosol-generating system, and more particularly, to an aerosol-generating article including a front end plug with a channel and an aerosol-generating system including the same.

BACKGROUND ART

Recently, the demand for alternative methods to overcome the shortcomings of traditional aerosol-generating articles (cigarettes) has increased. For example, there is growing demand for a method of generating aerosol by heating an aerosol-generating material in aerosol-generating articles, rather than by combusting aerosol-generating articles. Accordingly, studies on a heating-type aerosol-generating article or a heating-type aerosol-generating device have been actively conducted.

The aerosol-generating article may include a front end plug disposed at an upstream end with respect to the flowing direction of the aerosol. In the case where the aerosol generated from the outside of the aerosol-generating article flows in through the upstream end of the aerosol-generating article and flows out through the downstream end, the front end plug may interfere with the flow of the aerosol, making it difficult for the user to easily inhale the aerosol. Accordingly, research has been conducted on preventing a front end plug from interfering with aerosol flow.

DESCRIPTION OF EMBODIMENTS

Technical Problem

A technical problem to be solved by the present disclosure is to provide an aerosol-generating article and an aerosol-generating system including a front end plug that prevents an aerosol-generating material from escaping to the outside of an aerosol-generating article and does not interfere with a flow of the aerosol. The technical problem to be solved is not limited to the technical problem as described above, and other technical problems may exist.

Solution to Problem

An aerosol-generating article that passes aerosol from an upstream end to a downstream end includes a medium portion, a front end plug disposed to face an upstream end of the medium portion, and a filter portion disposed to face a downstream end of the medium portion, wherein the front end plug includes a channel extending from the upstream end to the downstream end.

Advantageous Effects of Disclosure

A front end plug is disposed on a downstream side of a medium portion, so that the medium portion can be prevented from escaping to the outside of an aerosol-generating article. In addition, because the front end plug includes a channel, aerosol flowing into the upstream end of the front end plug can be easily escaped to the downstream end of the front end plug, and a user can easily inhale the aerosol.

The effects of the invention are not limited by contents exemplified above, and more various effects are included in the present specification.

BEST MODE

Figure 1:
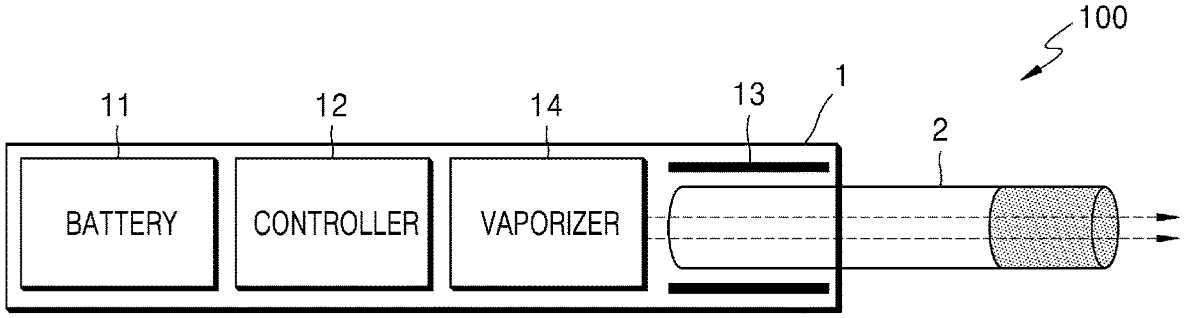
FIGS. 1 and 2 are diagrams illustrating examples in which an aerosol-generating article is inserted into an aerosol-generating device.

An aerosol-generating article that passes aerosol from an upstream end to a downstream end includes a medium portion, a front end plug disposed to face an upstream end of the medium portion, and a filter portion disposed to face a downstream end of the medium portion, wherein the front end plug includes a channel extending from the upstream end to the downstream end.

In the aerosol-generating article according to an embodiment, a ratio of a cross-sectional area of the channel to a total cross-sectional area calculated based on an outer diameter of the front end plug is in a range of 14% to 29%.

In the aerosol-generating article according to an embodiment, a cross-sectional area of the channel is in a range of 5 mm2 to 11 mm2.

In the aerosol-generating article according to an embodiment, a minimum distance between an outer peripheral surface of the channel and an outer peripheral surface of the front end plug is 1.0 mm or more.

In the aerosol-generating article according to an embodiment, the channel includes at least three leg portions extending outward from a center of the channel.

In the aerosol-generating article according to an embodiment, a mono denier of the front end plug is in a range of 3 to 7, and a total denier of the front end plug is in a range of 25000 to 35000.

In the aerosol-generating article according to an embodiment, an outer diameter of the front end plug is included in a range of 6 mm to 8 mm.

An aerosol-generating system according to another embodiment includes an aerosol-generating article, and an aerosol-generating device into which the aerosol-generating article is inserted, wherein the aerosol-generating device includes a battery and a heater heated by electric power supplied from the battery, and the aerosol-generating article includes a medium portion, a front end plug disposed toward an upstream side of the medium portion, and a filter portion disposed toward a downstream side of the medium portion, wherein the front end plug includes a channel extending from an upstream end to a downstream end.

Mode of Disclosure

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, some terms are arbitrarily selected by an applicant, and in this case, their meanings will be described in detail in the description of an invention. Therefore, the terms used in the present invention should be defined based on meanings of the terms and contents of the present invention, not simply names of the terms.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

In the following embodiments, with respect to the terms "upstream" and "downstream", when a user inhales air using a smoking article, a portion in which air enters into an aerosol-generating article from the outside is referred to as "upstream", and a portion in which air exits from inside the aerosol-generating article to the outside is referred to as "downstream". The terms "upstream" and "downstream" are terms used to indicate a relative position or direction between the segments that constitute the aerosol-generating article.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present invention will be described in detail with reference to the drawings.

Figure 2:
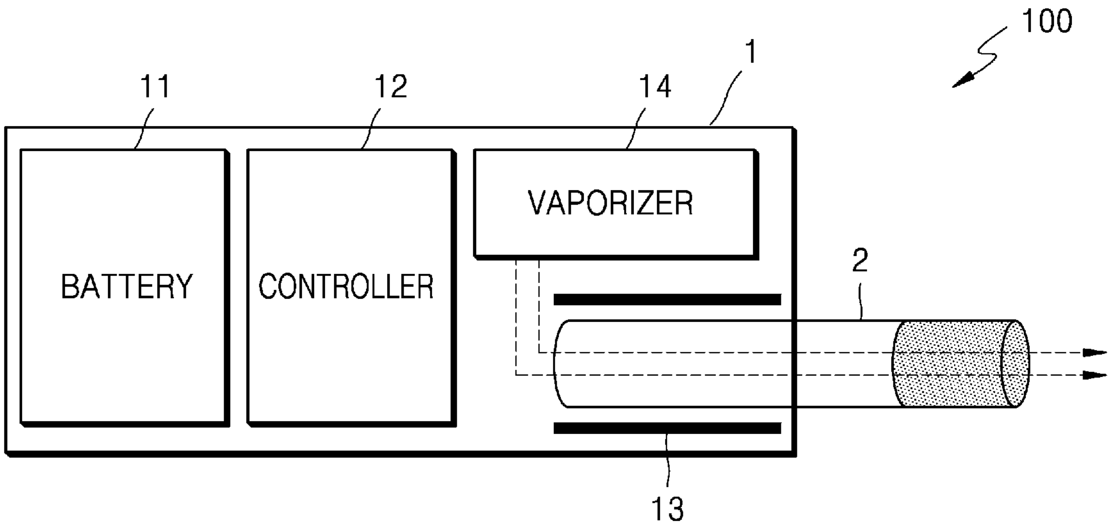

FIGS. 1 and 2 are diagrams showing examples in which an aerosol-generating article is inserted into an aerosol-generating device.

Referring to FIGS. 1 and 2, an aerosol-generating system 100 includes the aerosol-generating device 1 and the aerosol-generating article 2 inserted into the aerosol-generating device 1.

An aerosol-generating device 1 includes a battery 11, a controller 12, a heater 13, and a vaporizer 14. Also, an aerosol-generating article 2 may be inserted into an inner space of the aerosol-generating device 1.

FIGS. 1 and 2 only illustrate components of the aerosol-generating device 1 which are related to the present embodiment. Therefore, it will be understood by one of ordinary skill in the art related to the present embodiment that other general-purpose components may be further included in the aerosol-generating device 1, in addition to the components illustrated in FIGS. 1 and 2.

FIG. 1 illustrates that the battery 11, the controller 12, the vaporizer 14, and the heater 13 are arranged in series. Also, FIG. 2 illustrates that the vaporizer 14 and the heater 13 are arranged in parallel. However, the internal structure of the aerosol-generating device 1 is not limited to the structures illustrated in FIG. 1 or FIG. 2. In other words, according to the design of the aerosol-generating device 1, the battery 11, the controller 12, the vaporizer 14, and the heater 13 may be differently arranged.

When the aerosol-generating article 2 is inserted into the aerosol-generating device 1, the aerosol-generating device 1 may operate the heater 13 and/or the vaporizer 14 to generate aerosol. The aerosol generated by the heater 13 and/or the vaporizer 14 is delivered to the user after passing through the aerosol-generating article 2.

If necessary, the aerosol-generating device 1 may heat the heater 13 even while the aerosol-generating article 2 is not inserted into the aerosol-generating device 1.

The battery 11 may supply power to be used for the aerosol-generating device 1 to operate. For example, the battery 11 may supply power to heat the heater 13 or the vaporizer 14 and may supply power for operating the controller 12. Also, the battery 11 may supply power for operations of a display, a sensor, a motor, etc. mounted in the aerosol-generating device 1.

The controller 12 may control overall operations of the aerosol-generating device 1. In detail, the controller 12 may control not only operations of the battery 11, the heater 13, and the vaporizer 14, but also operations of other components included in the aerosol-generating device 1. Also, the controller 12 may check a state of each component of the aerosol-generating device 1 to determine whether or not the aerosol-generating device 1 is able to operate.

The controller 12 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the aerosol-generating article 2 is inserted into the aerosol-generating device 1, the heater 13 may be located outside the aerosol-generating article 2. Thus, the heated heater 13 may increase a temperature of an aerosol-generating material in the aerosol-generating article 2.

The heater 13 may include an electro-resistive heater. For example, the heater 13 may include an electrically conductive track, and the heater 13 may be heated when currents flow through the electrically conductive track. However, the heater 13 is not limited to the example described above and may include any other heaters capable of being heated to a desired temperature. Here, the desired temperature may be pre-set in the aerosol-generating device 1 or may be set by a user.

As another example, the heater 13 may include an induction heater. In detail, the heater 13 may include an electrically conductive coil for heating an aerosol-generating article by an induction heating method, and the aerosol-generating article may include a susceptor which may be heated by the induction heater.

For example, the heater 13 may include a tube-type heating element, a plate-type heating element, a needle-type heating element, or a rod-type heating element, and may heat the inside or the outside of the aerosol-generating article 2, according to the shape of the heating element.

Also, the aerosol-generating device 1 may include a plurality of heaters 13. Here, the plurality of heaters 13 may be inserted into the aerosol-generating article 2 or may be arranged outside the aerosol-generating article 2. Also, some of the plurality of heaters 13 may be inserted into the aerosol-generating article 2, and the others may be arranged outside the aerosol-generating article 2. In addition, the shape of the heater 13 is not limited to the shapes illustrated in FIGS. 1 and 2 and may include various shapes.

The vaporizer 14 may generate aerosol by heating a liquid composition and the generated aerosol may pass through the aerosol-generating article 2 to be delivered to a user. In other words, the aerosol generated via the vaporizer 14 may move along an air flow passage of the aerosol-generating device 1 and the air flow passage may be configured such that the aerosol generated via the vaporizer 14 passes through the aerosol-generating article 2 to be delivered to the user.

For example, the vaporizer 14 may include a liquid storage, a liquid delivery element, and a heating element, but it is not limited thereto. For example, the liquid storage, the liquid delivery element, and the heating element may be included in the aerosol-generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14 or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

The aerosol-generating device 1 may further include general-purpose components in addition to the battery 11, the controller 12, the heater 13, and the vaporizer 14. For example, the aerosol-generating device 1 may include a display capable of outputting visual information and/or a motor for outputting haptic information. Also, the aerosol-generating device 1 may include at least one sensor. Also, the aerosol-generating device 1 may be formed as a structure where, even when the aerosol-generating article 2 is inserted into the aerosol-generating device 1, external air may be introduced or internal air may be discharged.

Although not illustrated in FIGS. 1 and 2, the aerosol-generating device 1 and an additional cradle may form together a system. For example, the cradle may be used to charge the battery 11 of the aerosol-generating device 1. Also, the heater 13 may be heated when the cradle and the aerosol-generating device 1 are coupled to each other.

The aerosol-generating article 2 may be similar to a general combustive aerosol-generating article. For example, the aerosol-generating article 2 may be divided into a first portion including an aerosol-generating material and a second portion including a filter, etc. Alternatively, the second portion of the aerosol-generating article 2 may also include an aerosol-generating material. For example, an aerosol-generating material made in the form of granules or capsules may be inserted into the second portion.

The entire first portion may be inserted into the aerosol-generating device 1, and the second portion may be exposed to the outside. Alternatively, only a portion of the first portion may be inserted into the aerosol-generating device 1, or a portion of the first portion and a portion of the second portion may be inserted thereinto. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol-generating device 1. For example, opening and closing of the air passage and/or a size of the air passage may be adjusted by the user. Accordingly, the amount and quality of vapor may be adjusted by the user. As another example, the external air may flow into the aerosol-generating article 2 through at least one hole formed in a surface of the aerosol-generating article 2.

Hereinafter, an example of the aerosol-generating article 2 will be described with reference to FIG. 3.

Figure 3:
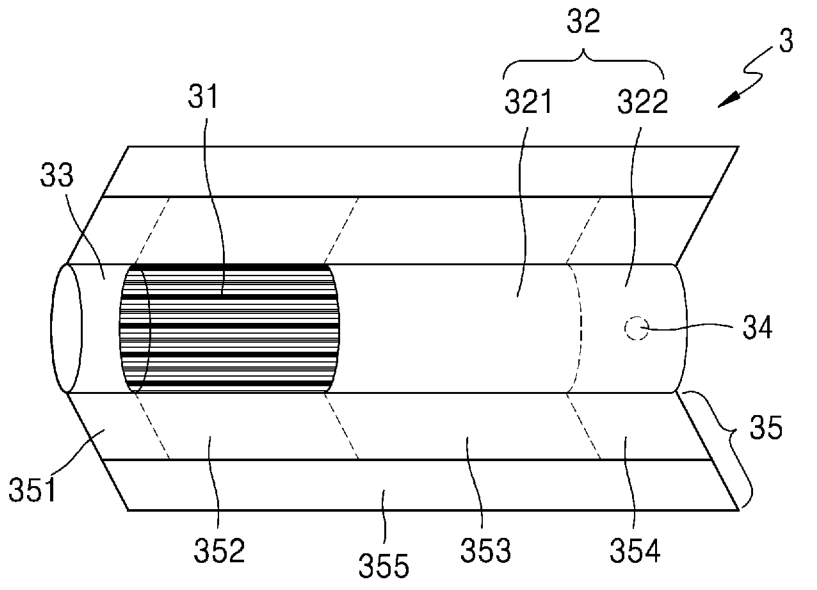
FIG. 3 is a diagram showing an example of an aerosol-generating article.

FIG. 3 is a drawing illustrating an example of an aerosol-generating article.

Referring to FIG. 3, the aerosol-generating article 2 includes a medium portion 31, a filter portion 32, and a front end plug 33. The first portion described above with reference to FIGS. 1 and 2 may include the medium portion 31 and the front end plug 33, and the second portion described above with reference to FIGS. 1 and 2 may include the filter portion 32.

The medium portion 31 may include an aerosol-generating material. For example, the aerosol-generating material may include at least one of glycerin, propylene glycol, ethylene glycol, dipropylene glycol, diethylene glycol, triethylene glycol, tetraethylene glycol, and oleyl alcohol, but it is not limited thereto. Also, the medium portion 31 may include other additives, such as flavors, a wetting agent, and/or organic acid. Also, the medium portion 31 may include a flavored liquid, such as menthol or a moisturizer, which is injected to the medium portion 31.

The medium portion 31 may be manufactured in various forms. For example, the medium portion 31 may be formed using sheets or strands. Also, the medium portion 31 may be formed using tiny bits cut from a tobacco sheet. Also, the medium portion 31 may be surrounded by a heat conductive material. For example, the heat-conducting material may be, but is not limited to, a metal foil such as aluminum foil. For example, the heat conductive material surrounding the medium portion 31 may uniformly distribute heat transmitted to the medium portion 31, and thus, the heat conductivity of the medium portion may be increased and taste of the tobacco may be improved. Also, the heat conductive material surrounding the medium portion 31 may function as a susceptor heated by the induction heater. Here, although not illustrated in the drawings, the medium portion 31 may further include an additional susceptor, in addition to the heat conductive material surrounding the medium portion 31.

The filter portion 32 may include a first segment 321 and a second segment 322.

The first segment 321 may be a cellulose acetate filter. For example, the first segment 321 may be a tube-shaped structure including a hollow. The aerosol may be cooled by the first segment 321. The diameter of the hollow included in the first segment 321 may be an appropriate diameter within a range of 2 mm to 4.5 mm, but is not limited thereto.

A length of the first segment 321 may be an appropriate length within a range of 4 mm to 30 mm, but is not limited thereto. Preferably, the length of the first segment 321 may be 12 mm, but is not limited thereto.

The first segment 321 may be manufactured by inserting a structure such as a film or tube into the interior (for example, hollow) of the first segment 321.

The second segment 322 may be a cellulose acetate filter. A length of the second segment 322 may be an appropriate length within a range of 4 mm to 20 mm. For example, the length of the second segment 322 may be about 14 mm, but is not limited thereto.

Also, the second segment 322 may include at least one capsule 34. Here, the capsule 34 may generate a flavor or aerosol. For example, the capsule 34 may have a configuration in which a liquid containing a flavoring material is wrapped with a film. For example, the capsule 34 may have a spherical or cylindrical shape, but is not limited thereto.

The front end plug 33 may prevent the medium portion 31 from escaping out of the aerosol-generating article, and may prevent the liquefied aerosol from flowing into the aerosol-generating device (reference numeral 1 in FIGS. 1 and 2) during the smoking.

The front end plug 33 may be made of cellulose acetate. A mono denier of a filament constituting cellulose acetate tow may be in a range of 1.0 to 10.0, and preferably may be in the range of 3.0 to 7.0. More preferably, the mono denier of the filament of the front end plug 33 may be 5.0. A total denier of the front end plug 33 may be in the range of 25000 to 35000, and preferably may be in the range of 28000 to 32000. More preferably, the total denier may be 30000.

The aerosol-generating article 3 may be wrapped by at least one wrapper 35. The wrapper 35 may have at least one hole through which external air flows in or internal gas flows out. For example, the front end plug 33 may be wrapped by a first wrapper 351, the medium portion 31 may be wrapped by a second wrapper 352, the first segment 321 may be wrapped by a third wrapper 353, and the second segment 322 may be wrapped by a fourth wrapper 354. In addition, the entire aerosol-generating article 3 may be rewrapped by a fifth wrapper 355.

Figure 4:
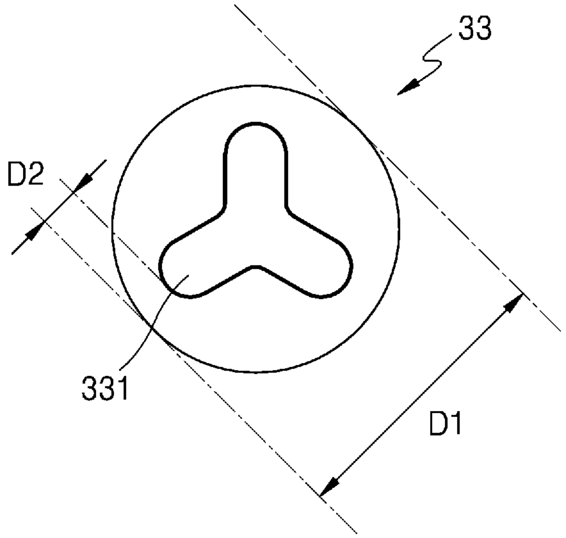
FIGS. 4 and 5 are diagrams showing examples of a cross-section of a front end plug.

FIG. 4 is a view showing an example of a cross section of the front end plug.

Referring to FIG. 4, the front end plug 33 includes a channel 331 that extends downstream.

The channel 331 may be located in a center of the front end plug 33. For example, a center of the channel 331 may coincide with the center of the front end plug 33.

The channel 331 may include three leg portions extending outward from the center of the channel. That is, the channel 331 may have a three-leaf shape as shown in FIG. 4. For example, the three leg portions may be extended so that the angles between neighboring leg portions are uniform. As another example, the three leg portions may be extended so that the angles between the leg portions are not uniform.

A cross-sectional area of the channel 331 may be in a range of 5 $mm^2$ to 11 $mm^2$. For example, the cross-sectional area of the channel 331 may be about 5.75 $mm^2$, about 8.21 $mm^2$, or about 10.89 $mm^2$, but is not limited thereto.

A ratio of the cross-sectional area of the channel 331 to a total cross-sectional area based on an outer diameter D1 of the front end plug 33 may be in a range of 14% to 29%. For example, the ratio may be about 14.9%, about 21.3%, or about 28.3%, but is not limited thereto.

For example, when the outer diameter D1 of the front end plug 33 is 7 mm, the total cross-sectional area based on the outer diameter D1 of the front end plug 33 is 12.25π $mm^2$. Since a proportion of the cross-sectional area occupied by the channel 331 in the front end plug 33 is in the range of 14% to 29%, the cross-sectional area of the channel 331 may be in the range of 5.3 $mm^2$ to 11.2 $mm^2$.

A minimum distance D2 between an outer peripheral surface of the channel 331 and an outer peripheral surface of the front end plug 33 may be 1.0 mm or more. Preferably the minimum distance D2 may be in the range of 1.0 mm to 1.4 mm. For example, the minimum distance D2 may be about 1.0 mm, about 1.2 mm, or about 1.4 mm, but is not limited thereto.

The front end plug 33 is disposed to face the downstream end of the medium portion (reference numeral 31 in FIG. 3), so that the medium portion may be prevented from escaping out of the aerosol-generating article (reference numeral 3 in FIG. 3).

In addition, because the front end plug 33 includes a channel 331, the aerosol flowing in through the upstream end of the front end plug 33 may easily escape through the downstream end of the front end plug 33, thereby allowing the user to easily inhale the aerosol.

Table 1 is a table comparing components of an aerosol discharged from an aerosol-generating article, according to an example experiment. The outer diameter D1 of the front end plug 33 used in this example is 7 mm. Experiments have been conducted for the cases where the cross-sectional area of the channel 331 is about 5.75 $mm^2$, about 8.21 $mm^2$, and about 10.89 $mm^2$.

TABLE 1

| Cross-sectional area of channel | TPM* | Nicotine | PG** | Glycerin | Moisture |
|---|---|---|---|---|---|
| 5.75 $mm^2$ | 63.75 | 0.67 | 3.53 | 8.03 | 31.39 |
| 8.21 $mm^2$ | 62.28 | 0.66 | 3.38 | 7.85 | 31.27 |
| 10.89 $mm^2$ | 61.38 | 0.64 | 3.23 | 7.72 | 30.89 |

*TPM: total particulate matter
**PG: propylene glycol

According to Table 1, even if the cross-sectional area of the channel 331 is changed to about 5.75 $mm^2$, about 8.21 $mm^2$, and about 10.89 $mm^2$, the components of the discharged aerosol have similar values. Accordingly, it may be seen that even if the cross-sectional area of the channel 331 has an arbitrary value within the range of about 5 $mm^2$ to about 11 $mm^2$, the components of the discharged aerosol remain similar.

In addition, considering that the discharged aerosol components are similar, it may be seen that the aerosol flowing in through the upstream end of the front end plug 33 easily escapes through the downstream end of the front end plug 33. Therefore, it may be seen that even if the cross-sectional area of the channel 331 has an arbitrary value in the range of about 5 $mm^2$ to about 11 $mm^2$, the front end plug 33 may smoothly deliver the aerosol.

Table 2 is a table comparing the rates of the medium portion escaping through the channel of the front end plug, according to an example experiment. The total cross-sectional area of the front end plug is 12.25π $mm^2$, and the cross-sectional area of the channel is about 10.89 $mm^2$ in the experiment. Experiments have been conducted for the cases where the cross-sectional of the channel is a circular shape and a three-leaf shape as shown in FIG. 4.

TABLE 2

| Shape of cross section | Separation rate of medium portion (%) |
|---|---|
| Circular shape | 0.35 |
| Three-leaf shape | 0.21 |

According to Table 2, the separation rate of the medium portion has similar values in the case where the channel cross section has a circular shape and the case where the channel cross section has a three-leaf shape. Accordingly, it may be seen that even when the cross-section of the channel has a three-leaf shape instead of a circular shape, the separation rate of the medium portion does not increase. In addition, when the cross-section of the channel has a three-leaf shape, it may be seen that the separation rate of the medium portion is very low at 0.21%. Therefore, it may be seen that even when the cross-section of the channel of the front end plug 33 has a three-leaf shape, the separation of the medium portion may be effectively prevented. The front end plug 33 may be manufactured to minimize a cutting surface breakage rate and a fluff occurrence rate. The front end plug 33 may be manufactured by cutting a raw material to a designed length. When the channel 331 is positioned too close to an outer circumferential surface of the front end plug 33, the raw material may not be cut neatly and the cut surface may break or may make fluff. If the cut surface is broken or fluff is made during the manufacturing process, such front end plugs are defective products that should not be used. The minimum distance (D2) between the outer circumferential surface of the channel 331 and the outer circumferential surface of the front end plug 33 in the front end plug 33 may be 1.0 mm or more so that the cutting surface breakage rate and a fluff occurrence rate are minimized in the manufacturing process, and the front end plug 33 may be manufactured at a low rate of defectives.

Table 3 is a table comparing the cutting surface breakage rates and the fluff occurrence rates of a manufacturing process of the front end plug according to an example experiment. The cutting surface breakage rate represents a rate at which the cutting surface is broken by the speed or force of the knife cutting the raw material in a process of manufacturing the front end plug 33, thereby producing an unusable product. The fluff occurrence rate represents a rate at which the cutting surface of the raw material is not cut cleanly. In an example experiment, the front end plug 33 having an outer diameter (D1) of about 7 mm has been manufactured. This experiment has been performed on the cases where the minimum distance D2 between the outer circumferential surface of the front end plug 33 and the outer circumferential surface of the channel 331 is about 0.6 mm, about 0.8 mm, about 1.0 mm, and about 1.4 mm.

TABLE 3

| Minimum distance between outer peripheral surface of front end plug and outer peripheral surface of channel (mm) | Quality of cut surface: Breakage occurrence rate (%) | Quality of cut surface: Fluff occurrence rate (%) |
|---|---|---|
| 0.6 | 25.8 | 16.0 |
| 0.8 | 5.2 | 5.3 |
| 1.0 | 0 | 4.2 |
| 1.2 | 0 | 4.1 |
| 1.4 | 0 | 1.8 |

According to Table 3, when the minimum distance D2 between the outer circumferential surface of the front end plug 33 and the outer circumferential surface of the channel 331 is 1.0 mm or more, the breakage occurrence rate of the cut surface is 0% and the fluff occurrence rate is 5% or less. Accordingly, it may be seen that when the minimum distance D2 between the outer circumferential surface of the front end plug 33 and the outer circumferential surface of the channel 331 is designed to be 1.0 mm or more, the front end plug 33 may be manufactured with a low occurrence rate of defectives. The front end plug 33 may be manufactured by cutting the raw material to a designed length and then cutting again the raw material wrapped by the wrapper to the designed length. Depending on the rotational speed of the knife cutting the raw material and the knife cutting the raw material wrapped by the wrapper, the rate at which the cut surface is broken or the fluff occurs may vary.

Table 4 is a table comparing cutting surface breakage rates and fluff occurrence rates in the manufacture of the front end plug according to an example experiment. In this experiment, the front end plug 33 whose the outer diameter (D1) is about 7 mm has been manufactured. The experiment was conducted by changing the speed of the knife cutting the raw material and the speed of the knife cutting the raw material wrapped by the wrapper.

TABLE 4

| | Knife rotational speed (RPM) | Quality of cut surface: Breakage occurrence rate (%) | Quality of cut surface: Fluff occurrence rate (%) | Quality of cut surface: Good product rate (%) |
|---|---|---|---|---|
| Cutting raw material | 1100 | 67.5 | 25.5 | 7.0 |
| | 800 | 25.5 | 51.0 | 23.5 |
| | 600 | 4.5 | 35.0 | 60.5 |
| | 400 | 0.5 | 12.5 | 87.0 |
| | 300 | 0 | 5.5 | 94.5 |
| | 200 | 0 | 3.5 | 96.5 |
| | 100 | 0 | 11.0 | 89.0 |
| Cutting raw material wrapped by wrapper | 1600 | 0 | 4.5 | 95.5 |
| | 600 | 0 | 2.5 | 97.5 |
| | 400 | 0 | 6.0 | 94.0 |
| | 300 | 0 | 6.5 | 93.5 |
| | 200 | 0 | 14.0 | 86.0 |
| | 100 | unable to cut | | |

According to Table 4, in the case of cutting the raw material, the good product rate of the front end plug 33 is the highest when a knife rotational speed is 200 rpm for raw material cutting, and when a knife rotational speed is 600 rpm for raw material cutting wrapped by a wrapper. Accordingly, it may be seen that the front end plug 33 may be manufactured with a low occurrence rate of defectives if the raw material is cut with a knife having a rotational speed of 200 rpm and the raw material wrapped by a wrapper is cut with a knife having a rotational speed of 600 rpm. In addition, according to an example experiment, when manufacturing a front end plug 33 using a raw material having mono denier of 5 and total denier of 30000, a breakage occurrence rate of the cut surface due to cutting of the raw material was reduced by 58%, compared to a case where a raw material has a mono denier of 5 and a total denier of 28000.

Therefore, when the front end plug 33 is manufactured by using a raw material having a mono denier of 5 and a total denier of 30000, it is possible to reduce the breakage occurrence rate of the cut surface and the proportion of defective products in manufacturing the front end plug 33.

Figure 5:
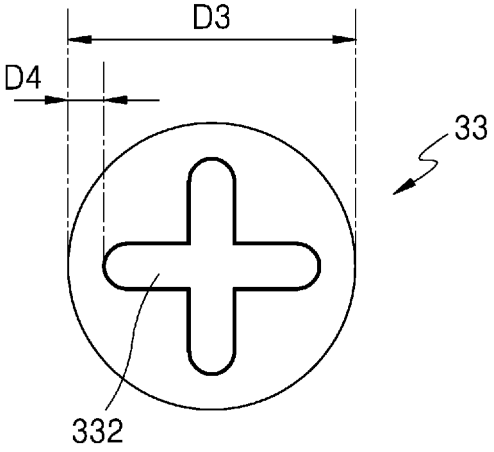

FIG. 5 is a view showing another example of the cross section of the front end plug.

Referring to FIG. 5, the front end plug 33 includes a channel 332 that extends downstream.

The channel 332 may include four leg portions extending outward from a center of the channel. That is, the channel 332 may be with a cross shape. For example, the four leg portions may be extended so that the angles between neighboring leg portions are uniform. Alternatively, the four leg portions may be extended so that the angles formed between neighboring leg portions are not uniform.

The cross-sectional area of the channel 332 may be in a range of 7 $mm^2$ to 14 $mm^2$. For example, the cross-sectional area of the channel 332 may be about 7.38 $mm^2$, about 7.92 $mm^2$, about 10.56 $mm^2$, about 13.17 $mm^2$, or about 13.71 $mm^2$, but is not limited thereto.

A rate of the cross-sectional area of the channel 332 to a total cross-sectional area based on an outer diameter D1 of the front end plug 33 may be included in a range of 19% to 36%. For example, the rate may be about 19.2%, about 20.6%, about 27.4%, about 34.2%, or about 35.6%, but is not limited thereto.

For example, when an outer diameter D3 of the front end plug 33 is 7 mm, a total cross-sectional area based on the outer diameter D2 of the front end plug 33 is 12.25π $mm^2$. As the rate of the cross-sectional area occupied by the channel 332 in the front end plug 33 is in the range of 19% to 36%, the cross-sectional area of the channel 332 may be within a range of 7.3 $mm^2$ to 13.9 $mm^2$.

A minimum distance D4 between an outer peripheral surface of the channel 332 and an outer peripheral surface of the front end plug 33 may be in a range of 1.0 mm to 1.4 mm. For example, the minimum distance D4 may be about 1.0 mm, about 1.2 mm, or about 1.4 mm, but is not limited thereto.

The front end plug 33 has to serve to prevent the separation of the medium portion. That is, the front end plug 33 should serve to prevent the medium portion (reference numeral 31 in FIG. 3) from escaping to the outside of the aerosol-generating article (reference numeral 3 in FIG. 3).

Table 5 is a table comparing the rates at which the medium portion escapes through the channel of the front end plug, according to an example experiment. In this experiment, a total cross-sectional area of the front end plug is 12.25π $mm^2$, and a channel cross-sectional area is about 13.71 $mm^2$. Experiments have been conducted on the cases where the cross-section of the channel is a circular shape and a cross shape as shown in FIG. 5.

TABLE 5

| Cross section shape | Separation rate of medium portion (%) |
|---|---|
| Circular | 0.35 |
| Cross-shaped | 0.19 |

According to Table 5, the separation rate of the medium portion is similar between the cases of the circular shape and the cross shape. Therefore, even if the cross-section of the channel is formed in a cross shape instead of a circular shape, the separation rate of the medium portion does not increase. In addition, when the cross-section of the channel has the cross shape, the separation rate of the medium portion is very low at 0.19%. As such, it can be seen that the front end plug 33 smoothly performs the function of preventing the separation of the medium portion. Those of ordinary skill in the art related to the present embodiments may understand that various changes in form and details can be made therein without departing from the scope of the characteristics described above. The disclosed methods should be considered in a descriptive sense only and not for purposes of limitation. The scope of the present invention is shown in the claims rather than the foregoing description, and all differences within the equivalent range should be construed as being included in the present invention.

What is claimed is:

1. An aerosol-generating article for passing aerosol from an upstream end to a downstream end, the aerosol-generating article comprising:
- a medium portion;
- a front end plug disposed to face an upstream end of the medium portion; and
- a filter portion disposed to face a downstream end of the medium portion,
- wherein the front end plug includes a channel extending from the upstream end to the downstream end,
- wherein the front end plug comprises cellulose acetate, and
- wherein a minimum distance between an outer peripheral surface of the channel and an outer peripheral surface of the front end plug is 1.0 mm to 1.4 mm.

2. The aerosol-generating article of claim 1, wherein a ratio of a cross-sectional area of the channel to a total cross-sectional area calculated based on an outer diameter of the front end plug is in a range of 14% to 29%.

3. The aerosol-generating article of claim 1, wherein a cross-sectional area of the channel is in a range of 5 $mm^2$ to 11 $mm^2$.

4. The aerosol-generating article of claim 1, wherein the channel includes at least three leg portions extending outward from a center of the channel.

5. The aerosol-generating article of claim 1, wherein a mono denier of the front end plug is in a range of 3 to 7, and
- a total denier of the front end plug is in a range of 25000 to 35000.

6. The aerosol-generating article of claim 1, wherein an outer diameter of the front end plug is in a range of 6 mm to 8 mm.

7. An aerosol-generating system comprising:
- an aerosol-generating article; and
- an aerosol-generating device into which the aerosol-generating article is inserted,
- wherein the aerosol-generating device includes a battery and a heater heated by electric power supplied from the battery, and
- wherein the aerosol-generating article includes:
- a medium portion;
- a front end plug disposed on an upstream side of the medium portion; and
- a filter portion disposed on a downstream side of the medium portion,
- wherein the front end plug includes a channel extending from an upstream end to a downstream end, wherein the front end plug comprises cellulose acetate, and wherein a minimum distance between an outer peripheral surface of the channel and an outer peripheral surface of the front end plug is 1.0 mm to 1.4 mm.

* * * * *